US011515908B2

(12) United States Patent
Sloushch et al.

(10) Patent No.: US 11,515,908 B2
(45) Date of Patent: Nov. 29, 2022

(54) IMPULSE RADIO ULTRA-WIDE BAND TRANSCEIVER USING RADIO PULSES WITH MULTI FREQUENCY CARRIERS

(71) Applicant: Elbit Systems Land and C4I Ltd, Netanya (IL)

(72) Inventors: Anatoly Sloushch, Netanya (IL); Ezra Zamir, Netanya (IL)

(73) Assignee: Elbit Systems Land and C4I Ltd., Netanya (IL)

( * ) Notice: Subject to any disclaimer, the term of this patent is extended or adjusted under 35 U.S.C. 154(b) by 0 days.

(21) Appl. No.: 17/720,890

(22) Filed: Apr. 14, 2022

(65) Prior Publication Data

US 2022/0239332 A1    Jul. 28, 2022

Related U.S. Application Data

(63) Continuation of application No. PCT/IL2020/051111, filed on Oct. 22, 2020.

(30) Foreign Application Priority Data

Oct. 23, 2019 (IL) .......................................... 270130

(51) Int. Cl.
*H04B 1/69* (2011.01)
*H04B 1/719* (2011.01)
*H04B 1/7163* (2011.01)
*H04B 1/7176* (2011.01)
*H04B 1/717* (2011.01)

(52) U.S. Cl.
CPC ........... *H04B 1/719* (2013.01); *H04B 1/7174* (2013.01); *H04B 1/7176* (2013.01); *H04B 1/71637* (2013.01)

(58) Field of Classification Search
CPC .. H04B 1/719; H04B 1/71637; H04B 1/7174; H04B 1/7176; H04B 1/69
USPC .......................................................... 375/130
See application file for complete search history.

(56) References Cited

U.S. PATENT DOCUMENTS

| 8,351,483 | B1 | 1/2013 | Tucker |
| 8,401,050 | B1* | 3/2013 | Fudge .................. H04B 1/0014 375/147 |
| 2002/0061081 | A1 | 5/2002 | Richards et al. |
| 2006/0039447 | A1 | 2/2006 | Sahinoglu et al. |

(Continued)

FOREIGN PATENT DOCUMENTS

WO    WO 2021/079369    4/2021

OTHER PUBLICATIONS

International Search Report and Written Opinion for PCT Application No. PCT/IL2020/051111, dated Jan. 25, 2021.

*Primary Examiner* — Don N Vo
(74) *Attorney, Agent, or Firm* — Pearl Cohen Zedek Latzer Baratz LLP (57) ABSTRACT

An impulse radio (IR) ultra-wide band (UWB) transceiver adapted for a rake receiver is provided herein. This may be implemented as follows: on the transmitter side, the input data is converted to N-parallel streams having different delays, each stream is transmitted by an impulse radio signal with defined different carrier frequency. On the receiver side, the multicarrier RF signal is converted into base band signal, emulating multipath channels, so that rake receiver technique is used for an optimal demodulation of the received signal.

15 Claims, 5 Drawing Sheets

(56) References Cited

U.S. PATENT DOCUMENTS

| | | | | |
|---|---|---|---|---|
| 2007/0025738 A1* | 2/2007 | Moore | ............... | H04B 10/1149 398/189 |
| 2014/0140420 A1* | 5/2014 | Ghovanloo | ....... | H04W 52/0209 375/259 |
| 2017/0237469 A1* | 8/2017 | Taghivand | ........... | H04B 5/0031 455/41.1 |

* cited by examiner

IMPULSE RADIO ULTRA-WIDE BAND TRANSCEIVER USING RADIO PULSES WITH MULTI FREQUENCY CARRIERS

CROSS REFERENCE TO RELATED APPLICATIONS

This application is a Continuation of International Application No. PCT/IL2020/051111, filed on Oct. 22, 2020, claiming priority from Israeli patent application No. 270130, filed on Oct. 23, 2019, both are incorporated herein by reference in their entireties.

FIELD OF THE INVENTION

The present invention relates generally to the field of Ultra-Wide Band (UWB) communication, and more particularly to an Impulse Radio (IR) UWB transceiver.

BACKGROUND OF THE INVENTION

Prior to setting forth the background of the invention, it may be helpful to provide herein definitions of certain terms that will be used hereinafter.

The term Ultra-Wideband (also known as "UWB", ultra-wide band and ultraband) as used herein is defined as a radio technology that can use a very low energy level for short-range, high-bandwidth communications over a large portion of the radio spectrum. Ultra-wideband is useful for transmitting information spread over a large bandwidth (>500 MHz). Typically, UWB transmitters transmit in a manner that does not interfere with conventional narrowband and carrier wave transmission in the same frequency band.

The term "Impulse Radio" abbreviated "IR" as used herein is defined as a UWB transceiver which uses extremely short pulses (0.1 to 1.5 Nanoseconds) and very low average power (in the milliwatt range). Ultra-Wideband Radiation has been defined as any radiation in which the 3 db bandwidth is at least 25% or greater of its center frequency or more than 500 MHz.

The term "rake receiver" as used herein is a radio receiver designed to counter the effects of multipath fading. It does this by using several "sub-receivers" called fingers, that is, several correlators each assigned to a different multipath component. Each finger independently decodes a single multipath component; at a later stage the contribution of all fingers is combined in order to make the most use of the different transmission characteristics of each transmission path. This could very well result in higher signal-to-noise ratio in a multipath environment than in a "clean" environment.

In impulse radio UWB communication known in the art, the wide signal bandwidth (Bandwidth ≥500 MHz) may be ensured by using a technique of direct sequence spread spectrum (DSSS). The RF signal may be made of very short (less the few nanoseconds) radio pulses having phase modulated carrier frequency.

In the IR UWB communication range, data rate and reliability are limited due to the following problems: firstly, the regulation rules limit the maximal power spectral density (PSD) of a UWB transmitted signal, therefore an improvement of RF link budget by increasing the transmit power is limited for a given signal BW. Secondly, Improvement of the RF link budget may be ensured by increasing the signal BW. However, this causes a significantly increased complexity of Digital processing, as well as increase of transceiver power consumption and hardware cost, especially for the Analog to Digital Converter (ADC), due to increased sample rate; and thirdly, the conventional Frequency Hopping (FH) method consists of serial data frames transmission on different carrier frequencies where the carrier frequency is changed for each data frame. Using the FH method for the considered DSSS UWB signal provides only limited protection against interference, since Interference at a specific frequency will deteriorate the signal during a defined interval, for example when frequencies of the desired signal and the interference are overlapped. At the same time the conventional FH method doesn't improve the RF link budget. Moreover, the time needed for the frequency changes reduce the data throughput.

Rake receiver technique allows better Signal-to-Noise (SNR) ratio and therefore the link budget in a multipath environment is better than in a "clean" environment of Line-of-Sight (LOS) propagation due to proper combining of different single-path components. Conventional application of the rake receiver in the IR UWB Radio cannot use this advantage in the case of LOS propagation.

The technical challenge is to improve the range, data rate and robustness of an IR UWB transceiver, without increasing transmit power density, which is limited due to regulations; without increasing the Base band bandwidth, which will increase DSP complexity and power consumption; and without employing frequency hopping, which will increase latency and reduce throughput.

SUMMARY OF THE INVENTION

In order to address the aforementioned technical challenge, and according to some embodiments of the present invention, an impulse radio UWB transceiver emulating a rake received is provided herein. This may be implemented as follows: on the transmitter side, the input data is converted to N-parallel streams having different delays, each stream is transmitted by an impulse radio signal with defined different carrier frequency. On the receiver side, the multi-carrier RF signal is converted into base band signal, emulating multipath channels, rake receiver technique is used for optimal demodulation of the received signal.

According to some embodiments of the present invention, a possible implementation of the impulse radio (IR) ultra-wide band (UWB) transceiver may include on the transmitter side: two or more pulse generators, wherein each pulse generator is configured to receive an input data signal and a clock signal, and generate a respective baseband signal, wherein each two adjacent data signals exhibit a data delay and each two adjacent clock signals exhibit a clock delay; two or more modulators, each configured to receive the respective baseband signal and generate a respective radio frequency (RF) signal on respective carrier frequencies; an RF combiner configured to combine the two or more RF signals into a combined RF signal; a power amplifier configured to amplify the combined RF signal; a Transmitter/Receiver (TX/RX) duplexer (such as an RF switch) configured to receive the amplified combined RF signal; and an antenna configured to transmit the amplified combined RF signal.

According to some embodiments of the present invention, the receiver side of the IR UWB transceiver may include: the aforementioned antenna and TX/RX duplexer; a low noise amplifier (LNA) configured to receive an incoming RF signal; an RF splitter configured to split the signal from the LNA into respective two or more respective RF signals based on the respective carrier frequencies; two or more downconverters, each configured to down convert the respective RF signals into baseband (BB) or a common intermediate frequency (IF); an IF/BB combiner configured to combine the outputs of the two or more downconverters into a combined IF/BB signal; an analog to digital converter (ADC) configured to convert the combined IF/BB signal into a digital signal; and a demodulator with a rake receiver configured to apply rake receiver technique to the digital signal, to yield output data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1:
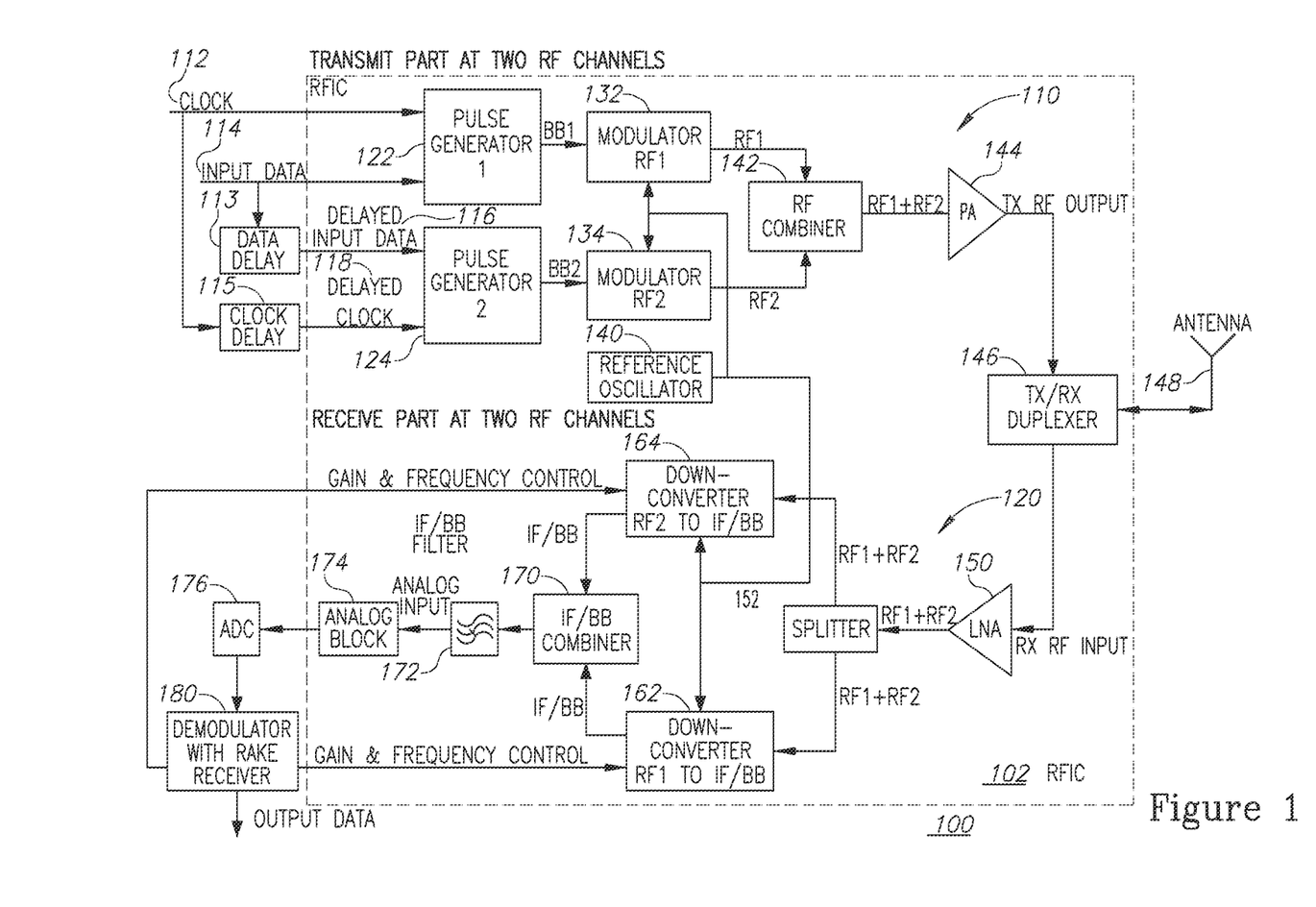
FIG. 1 is a block diagram illustrating a non-limiting exemplary architecture of the IR UWB transceiver in accordance with some embodiments of the present invention.

FIG. 1 is a block diagram illustrating a non-limiting exemplary architecture of the IR UWB transceiver 100 in accordance with some embodiments of the present invention.

In accordance with some embodiments of the present invention, on the transmitter 110 side, input data 114 and corresponding clock 112 are divided into several pairs of parallel streams having different delays, for example, delayed input data 116 and delayed clock 118 are a second pair. Each pair (e.g., 112 and 114, and 116 and 118) drives the input of a corresponding pulse generator 122 and 124 respectively which produces the baseband signal (BB1 and BB2 respectively).

According to some embodiments of the present invention, the pulse duration in the baseband signal may be less than 1/BW. The polarity of the pulses may be determined by the input data. The baseband signals may drive the inputs of corresponding modulators 132 (for BB1) and 134 (for BB2), each of which produce phase modulated RF pulses (e.g., RF1 and RF2) at a specific carrier and therefore corresponding frequency channel and has a defined spectral mask. The local oscillators (not shown) of the modulators have common frequency reference that arrives from a reference oscillator 140.

Transmitter 110 may further include an RF combiner 142 configured to combine phase modulated RF pulses (e.g., RF1 and RF2) and a power amplifier 144 configured to amplify the combined RF signal before it is combined by TX/RX duplexer 146 (possibly implemented by a switch or a diplexer) and transmitted through antenna 148.

According to some embodiments of the present invention the IR UWB transceiver may be implemented, in its entirety or at least partially, as an RF integrated circuit (RFIC), For example, all the components included by the dashed line 102 in FIG. 1 can be implemented in a single RFIC.

Figure 2:
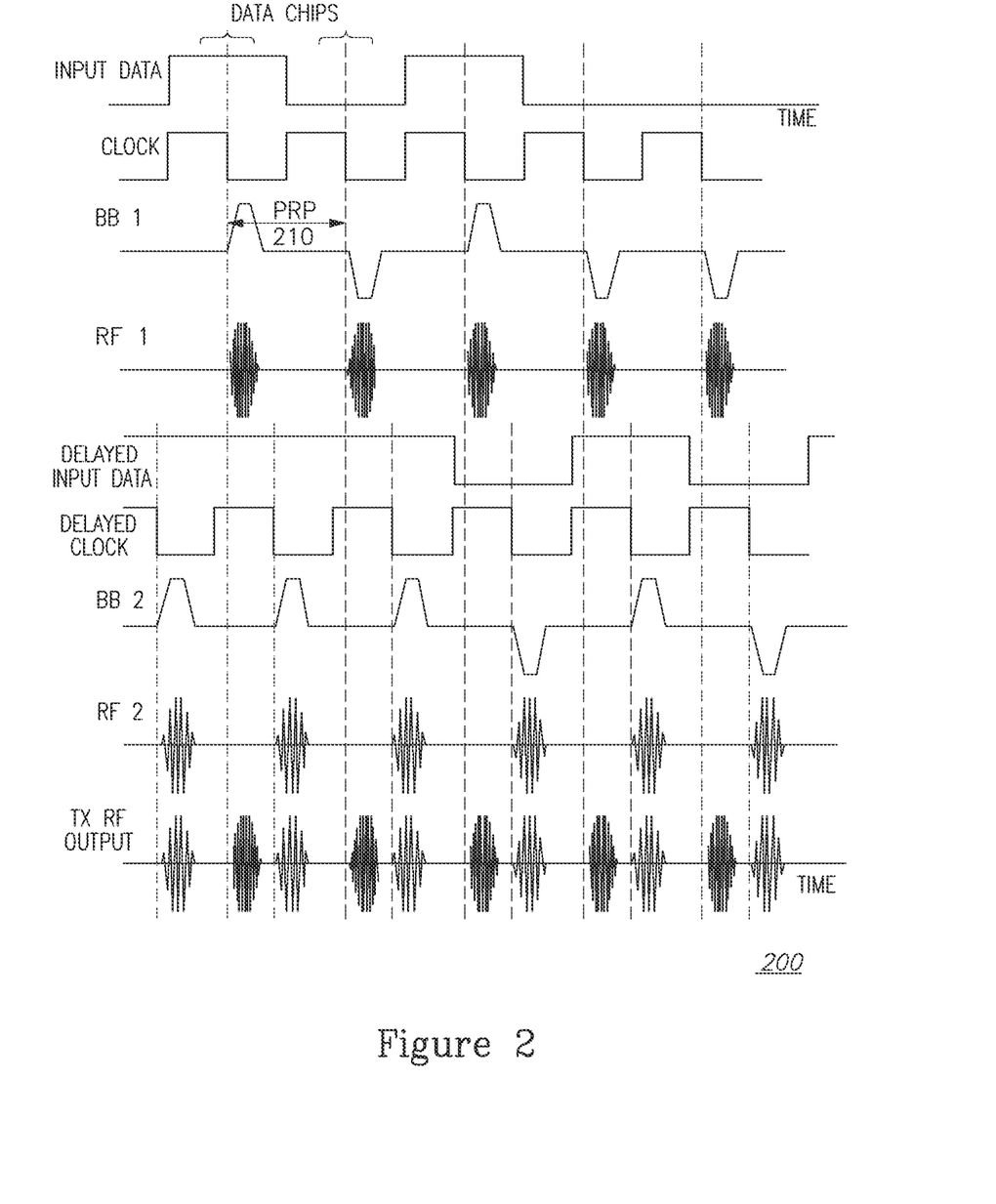
FIG. 2 is a transmit time diagram in accordance with some embodiments of the present invention.
Figure 3:
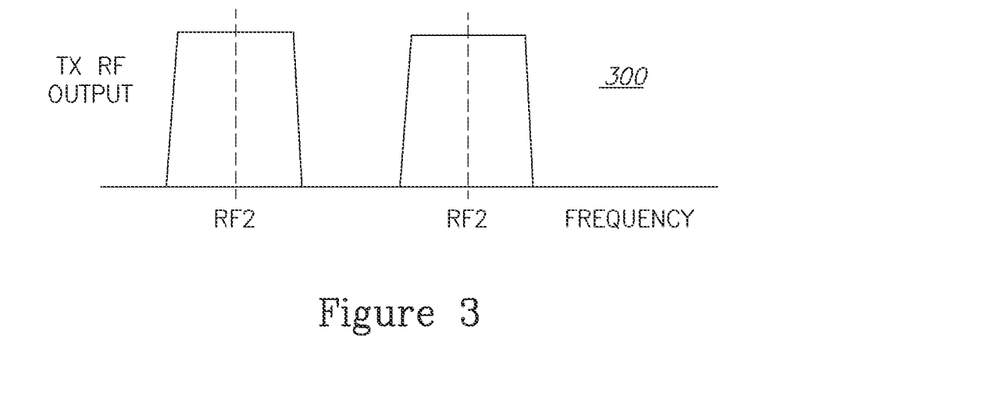
FIG. 3 is a transmit spectrum diagram in accordance with embodiments of the present invention.

FIG. 2 is a transmit time diagram 200 in accordance with some embodiments of the present invention. The timing diagram illustrates some requirements on the timing and specifically the delay imposed on the signals on the transmitter side. As can be seen, clock delay may be chosen so that after combining the mentioned RF pulses (e.g., RF1 and RF2) have a negligible overlap in time (to minimize intermodulation) and their number within the Pulse Repetition Period (PRP 210) is equal to the number of different carriers (RF channels, as illustrated in FIG. 3).

According to some embodiments of the present invention and as appears in time diagram 200, the clock delay may be longer than the pulse duration and shorter than PRP. According to some embodiments of the present invention, the data delay shall be longer than the PRP and shorter than maximal acceptable delay spread that is supported by the rake receiver on the receive side (as shall be discussed below).

Referring back to FIG. 1, receiver side 120 shows an RF input signal received by antenna 148, passing through the TX/RX duplexer 146, and amplified by low noise amplifier (LNA) 150 sufficiently to minimize the noise figure contribution of the following blocks of the receiver as detailed below.

Figure 4:
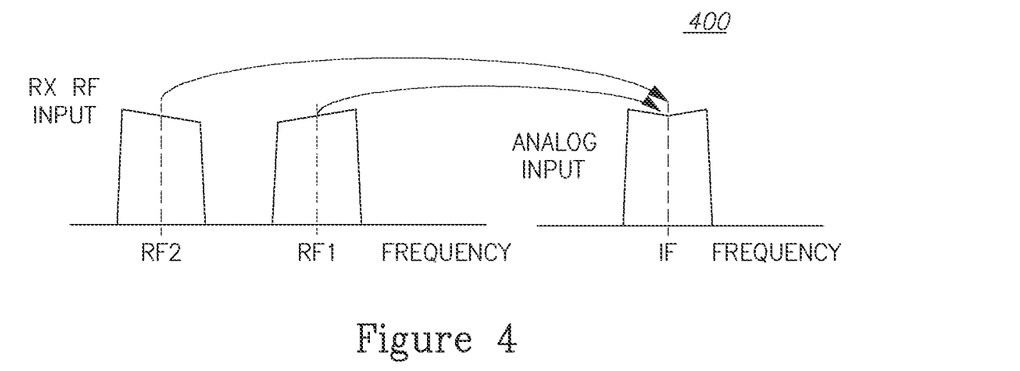
FIG. 4 is a receiver spectrum conversion diagram in accordance with embodiments of the present invention.

According to some embodiments of the present invention, the signal from LNA 150 output is split by RF splitter 152 between downconverters 162 and 164, each of which is tuned on a corresponding carrier (based on the different carriers of RF1 and RF2). The signal may then be converted to Intermediate Frequency (IF) or Base Band (BB) that are the same for all converters as illustrated in FIG. 4.

According to some embodiments of the present invention, the local oscillators (not shown) of downconverters 162 and 164 have a common frequency reference from a reference oscillator 140. The signal outputs from downconverters are summed by IF/BB combiner 170 and then filtered by an IF/BB filter 172.

According to some embodiments of the present invention, the output of IF/BB combiner 170 or IF/BB filter 172 may be now considered as a multi-path signal which is suitable for optimal demodulation by the rake receiver technique.

According to some embodiments of the present invention, the filtered signal is amplified and converted to BB if needed by an analog block 174 and then digitized by analog to digital converter (ADC 176) and then into a demodulator with a rake receiver 180.

According to some embodiments of the present invention, the digital demodulation process of the ADC samples may by implemented by rake receiver techniques as known in the art. The maximal value of delay spread that may be supported by the rake receiver is defined by design.

According to some embodiments of the present invention, a simplified explanation of the rake receiver technique is described herein. The rake operation ensures coherent summation of amplitudes and phases of the received desired signals (from different RF frequencies), but the received thermal noise and interference from different channels summation result depends on their statistical properties. Generally, the thermal noise from the different channels is not correlated.

According to some embodiments of the present invention, assuming that two RF channels are used (RF1 and RF2), where the thermal noise power and desired signals are correspondently the same in both channels, then the expected SNR improvement, compared with IR UWB transceiver known in the art, is approximately 3 dB. It is understood of course that a larger number of channels may be used with similar or better performance.

Advantageously and according to some embodiments of the present invention increasing the number of the RF channels beyond the two channels as discussed above does not significantly increase the complexity of the gain setting of the receiver. Thus, adding more RF channels can easily benefit by the rake receiver arrangement provided herein.

Figure 5A:
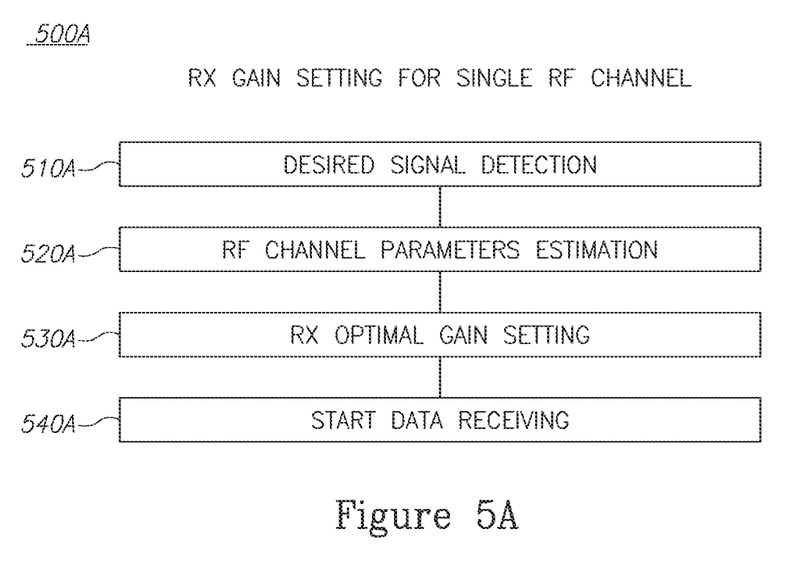
FIGS. 5A and 5B are high-level flowcharts illustrating a non-limiting exemplary method of optimal gain setting at the receiver in accordance with embodiments of the present invention.
Figure 5B:
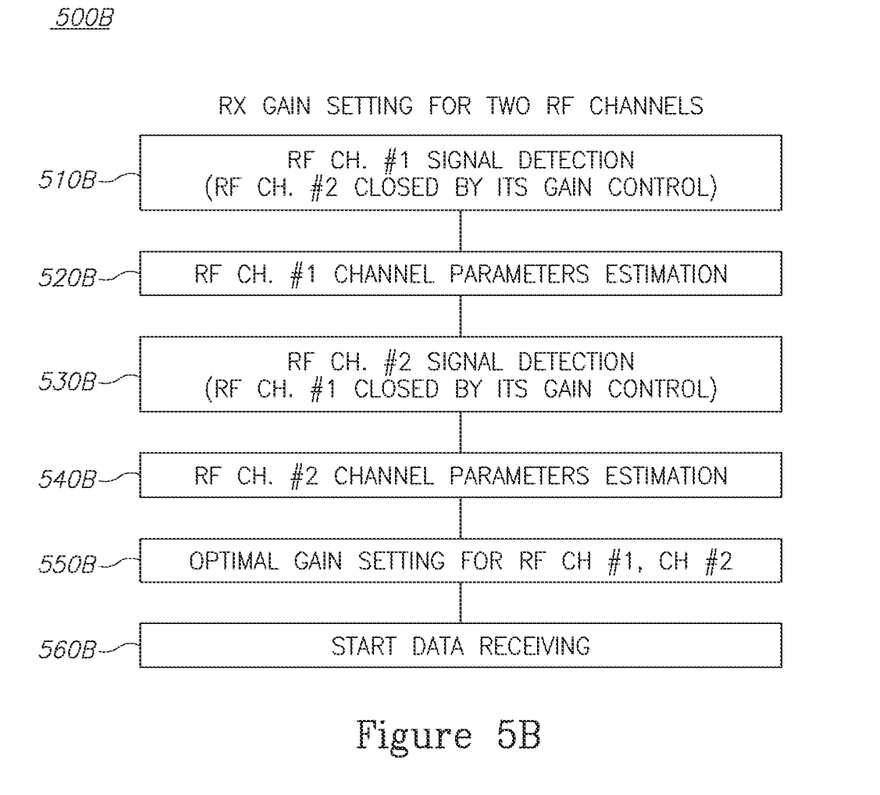

FIGS. 5A and 5B are high-level flowcharts illustrating a non-limiting exemplary method of optimal gain setting at the receiver in accordance with embodiments of the present invention. Specifically, in a case that the Signal-to-Noise-Ratio (SNR) or Signal-to-Interference-Ratio (SIR) in one of the channels is significantly worse than in the others, then the Demodulator may minimize the influence of problematic channels using corresponding gain control of down-converters by appropriate optimal Gain setting algorithm.

FIG. 5A illustrates RX gain setting for a single RF channel that may include the following steps: desired signal detection 510A; RF channel parameters estimation 520A such as Channel Impulse Response (CIR), Signal to Noise Ratio (SNR) and Signal to Interference Ratio (SIR); RX optimal gain setting 530A and start data receiving 540A.

FIG. 5B illustrates an RX gain setting for a two RF channels which may include the following steps: desired signal detection for RF channel #1 wherein RF channel #2 is closed by its gain control 510B, RF channel #1 parameters estimation 520B, desired signal detection for RF channel #2 wherein RF channel #1 is closed by its gain control 530B, RF channel #2 parameters estimation 540B, RX optimal gain setting for channels #1 and #2 550B and start data receiving 560B. It is understood that this process may be generalized for any number of channels.

As seen by comparing the flowcharts in FIG. 5A and FIG. 5B the complexity of the gain setting process in the receiver side is not significantly increased due to the added RF channel and further adding RF channels will also not result in a significant increase. Therefore, further embodiments with three or more RF channel can be implemented similarly, resulting in even a higher Signal to Noise Ratio (SNR) and Signal to Interference Ratio (SIR).

Advantageously, the IR UWB transceiver in accordance with some embodiments of the present invention provides an improved radio link budget and communication range and data rate due to enhanced SNR and SIR.

Further advantageously, the IR UWB transceiver in accordance with some embodiments of the present invention provide enhanced link reliability in the presence of interference and multi-path channels.

Finally, the IR UWB transceiver in accordance with some embodiments of the present invention provide low cost, low processing power and efficient implementation due to the same number of ADC's in the RX chain, same number of TX Power Amplifiers, RX Low Noise Amplifiers and Antennas as for a single channel receiver.

The aforementioned advantages are achieved by transmitting data simultaneously in more than one frequency channel utilizing the combining of multi frequency signals by the analog circuits of the receiver. The Digital demodulator with rake receiver technology has the capability of optimal reception of the combined signal, thereby increasing the SNR and SIR as compared with a single frequency receiver. If one of the frequency channels is problematic due to low SNR and SIR or out of the acceptable range of the multi-path delay spread, then the other channels still maintain a reliable communication.

Comparing the proposed and single channel transceivers, it is important to note that the mentioned advantages are guaranteed for the same transmit Power Spectral Density (PSD), the same number of ADC's in the RX chain, the same number of TX Power Amplifiers, RX Low Noise Amplifiers and Antennas.

As will be appreciated by one skilled in the art, aspects of the present invention may be embodied as a system, method or computer program product. Accordingly, aspects of the present invention may take the form of an entirely hardware embodiment (such as combination of any of: an integrated circuit (IC), discrete RF components and an RFIC), an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An impulse radio (IR) ultra-wide band (UWB) transceiver comprising:
    a transmitter side comprising:
        two or more pulse generators, wherein each pulse generator is configured to receive an input data signal and a clock signal, and generate a respective baseband signal, wherein each two adjacent data signals exhibit a data delay therebetween and each two adjacent clock signals exhibit a clock delay therebetween;
        two or more modulators, each configured to receive the respective baseband signal and generate a respective radio frequency (RF) signal on respective carrier frequencies;
        an RF combiner configured to combine the two or more RF signals into a combined RF signal;
        a power amplifier configured to amplify the combined RF signal;
        an RF duplexer configured to receive the amplified combined RF signal; and
        an antenna configured to transmit the amplified combined RF signal, and a receiver side comprising:
        said antenna and said duplexer;
        a low noise amplifier (LNA) configured to receive an incoming RF signal though said antenna;
        an RF splitter configured to split the incoming RF signal from the LNA into respective two or more respective RF signals based on the respective carrier frequencies;
        two or more downconverters, each configured to down convert the respective RF signals into baseband (BB) or a common intermediate frequency (IF);
        an IF/BB combiner configured to combine the outputs of the two or more downconverters into a combined IF/BB signal;
        an analog to digital converter (ADC) configured to convert the combined IF/BB signal into a digital signal; and
        a demodulator with a rake receiver configured to apply rake receiver technique to the digital signal, to yield an output data.

2. The IR UWB transceiver according to claim 1, implemented, at least partially, as an RF integrated circuit (RFIC).

3. The IR UWB transceiver according to claim 1, wherein said respective RF signal modulated on respective carrier frequencies comprise phase modulated RF pulse signals.

4. The IR UWB transceiver according to claim 1, wherein the bandwidth of the transceiver is greater than 500 MHz.

5. The IR UWB transceiver according to claim 1, wherein the pulse duration in the baseband signal is less than 1/BW of the transceiver.

6. The IR UWB transceiver according to claim 1, wherein the clock delay is longer than the pulse duration and shorter than the pulse repetition period.

7. The IR UWB transceiver according to claim 1, wherein the data delay is longer than the pulse repetition period and shorter than a maximal acceptable delay spread that is supported by the rake receiver of said demodulator.

8. The IR UWB transceiver according to claim 1, further comprising a reference oscillator, wherein the two or more modulators and the two or more downconverters each have a local oscillator synchronized with said reference oscillator.

9. The IR UWB transceiver according to claim 1, wherein said receiver further comprising a filter and an analog block between the BB/IF combiner and the ADC.

10. The IR UWB transceiver according to claim 1, wherein the LNA is selected to be sufficient to minimize the noise figure contribution of all blocks between the RF switch and the demodulator of said receiver.

11. An impulse radio (IR) ultra-wide band (UWB) transmitter comprising:
two or more pulse generators, wherein each pulse generator is configured to receive an input data signal and a clock signal, and generate a respective baseband signal, wherein each two adjacent data signals exhibit a data delay therebetween and each two adjacent clock signals exhibit a clock delay therebetween;
two or more modulators, each configured to receive the respective baseband signal and generate a respective radio frequency (RF) signal on respective carrier frequencies;
an RF combiner configured to combine the two or more RF signals into a combined RF signal;
a power amplifier configured to amplify the combined RF signal;
an RF duplexer configured to receive the amplified combined RF signal; and
an antenna configured to transmit the amplified combined RF signal.

12. The IR UWB transmitter according to claim 11, wherein said respective RF signal modulated on respective carrier frequencies comprise phase modulated RF pulse signals.

13. The IR UWB transmitter according to claim 11, wherein the pulse duration in the baseband signal is less than 1/BW of said IR UWB transmitter.

14. The IR UWB transmitter according to claim 11, wherein the clock delay is longer than the pulse duration and shorter than the pulse repetition period.

15. The IR UWB transmitter according to claim 11, wherein the data delay is longer than the pulse repetition period and shorter than a maximal acceptable delay spread that is supported by a rake receiver configured to receive signals from said IR UWB transmitter.

* * * * *